United States Patent

Manzoji et al.

[11] Patent Number: 6,156,437
[45] Date of Patent: Dec. 5, 2000

[54] CURABLE COMPOSITIONS USING SILOXANE GRAFTED VINYL POLYMERS

[75] Inventors: Ryuko Manzoji; Tadashi Okawa; Ryuzo Mikami, all of Chiba Prefecture, Japan

[73] Assignee: Dow Corning Toray Silicone Co., Ltd., Tokyo, Japan

[21] Appl. No.: 09/257,338

[22] Filed: Feb. 25, 1999

[30] Foreign Application Priority Data

Feb. 25, 1998 [JP] Japan ................................ 10-060655

[51] Int. Cl.$^7$ ......................... C08G 77/08; C08G 77/20; B32B 9/04
[52] U.S. Cl. ......................... 428/447; 427/387; 528/31; 528/32; 528/15; 525/100; 525/106; 526/279
[58] Field of Search ......................... 428/447; 427/387; 528/15, 31, 32; 525/100, 106; 526/279

[56] References Cited

U.S. PATENT DOCUMENTS

| | | | |
|---|---|---|---|
| 4,172,101 | 10/1979 | Getson | 525/101 |
| 6,072,013 | 6/2000 | Manzouji et al. | 526/279 |

FOREIGN PATENT DOCUMENTS 1-252616   10/1989   Japan .

Primary Examiner—Margaret G. Moore
Attorney, Agent, or Firm—Alan Zombeck

[57] ABSTRACT

A curable composition, comprising a siloxane grafted vinyl polymer as its main component, reacts with an organic silicon compound having silicon-bonded hydrogen atoms in the presence of a hydrosilylation catalyst to form a peelable cured coating film. The siloxane grafted vinyl polymer has two unique grafted siloxane chains represented by the following general formulae (A) and (B):

General Formula (A):

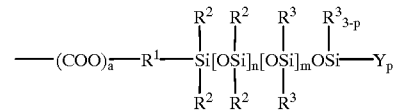

General Formula (B):

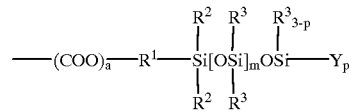

where $R^1$ is a divalent organic group, $R^2$ is a monovalent hydrocarbon group which is free of aliphatic bonds, $R^3$ is a monovalent hydrocarbon group, Y is a monovalent organic group having unsaturated aliphatic bonds, a is 0 or 1, m is an integer between 0 and 20, n is an integer which is 1 or greater, and p is an integer of 1, 2 or 3.

13 Claims, No Drawings

CURABLE COMPOSITIONS USING SILOXANE GRAFTED VINYL POLYMERS

FIELD OF THE INVENTION

The present invention relates to a curable composition which has a siloxane grafted vinyl polymer as its main component. The composition is cured by cross-linking the siloxane grafted vinyl polymer with an organic silicon compound having silicon-bonded hydrogen atoms in the presence of a hydrosilylation catalyst. The curable compositions of this invention can be used to form peelable coating films.

BACKGROUND OF THE INVENTION

Siloxane grafted vinyl polymers and their use in hydrosilylation reactions are known in the art. For example, copolymers of a radical-polymerizable monomer, such as a methyl methacrylate, and a polysiloxane having a degree of polymerization between 25 and 500 containing an alkenyl group on one molecular terminal and a radical-polymerizable group on the other molecular terminal are disclosed in Japanese Laid-Open Patent Application [Kokai] Hei 1-252,616. However, the content of the alkenyl groups in these vinyl polymers exerts its influence on the degree of polymerization of the polysiloxane and on the content of siloxane. In particular, an increase in the degree of polymerization in the siloxane chain decreases the content of the alkenyl groups. Therefore, even though the curing reaction results in some cross-linking from the use alkenyl groups, the composition is not sufficiently cured and thus not suitable as coating films. When the vinyl polymer is produced with radical-polymerizable monomers such as acrylic acid esters, copolymerization often results in gelation.

SUMMARY OF THE INVENTION

It is the object of the present invention to provide a curable composition which, even at a high degree of polymerization in a siloxane graft chain, can be effectively cured by a hydrosilylation reaction to form a peelable coating film.

The present invention claims a curable composition, comprising:
(a) a siloxane grafted vinyl polymer having grafted siloxane chains of the formulae (A) and (B):

Formula (A):

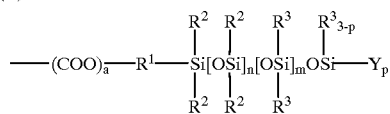

Formula (B):

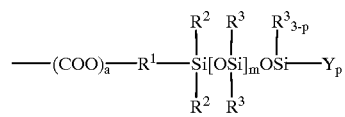

where $R^1$ is a divalent hydrocarbon group, $R^2$ is a monovalent hydrocarbon group which is free of aliphatic unsaturation, $R^3$ is a monovalent hydrocarbon group, Y is a monovalent hydrocarbon group having aliphatic unsaturation, a is 0 or 1, m is an integer between 0 and 20, n is an integer having a value of at least 1, and p is 1, 2, or 3;
(b) an organic silicon compound having at least two silicon-bonded hydrogen atoms; and
(c) a hydrosilylation catalyst.

DETAILED DESCRIPTION OF THE INVENTION

The siloxane grafted vinyl polymer, which constitutes component (a) of the composition of the present invention is a vinyl polymer having siloxane grafted side chains of two types represented by general formulae (A) and (B) given below and having aliphatic unsaturated bonds on the terminals.

Formula (A):

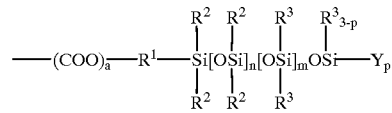

Formula (B):

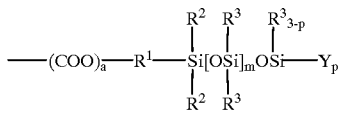

In these formulae, the divalent hydrocarbon group designated by $R^1$ can be represented by a divalent hydrocarbon group having two or more carbon atoms, or by the group represented by the following formula: $—R^9—O—R^9—$, where $R^9$ is a divalent hydrocarbon group. The following are specific examples of the divalent organic group: ethylene, propylene, butylene, hexylene, phenylene, and ethyleneoxypropylene group. $R^2$ designates a monovalent hydrocarbon group free of aliphatic unsaturation and can be represented by the following groups: methyl, ethyl, propyl, butyl, or similar alkyl groups; phenyl, tolyl, xylyl, or similar aryl groups; benzyl, phenylethyl, or similar arylalkyl group. $R^3$ is a monovalent hydrocarbon group represented by the following groups: methyl, ethyl, propyl, butyl, hexyl group, or similar alkyl groups; a phenyl, tolyl, xylyl, or similar aryl groups; benzyl, phenylethyl, or a similar arylalkyl group; vinyl, butenyl, hexenyl, or similar alkenyl groups. Y is a monovalent organic group having aliphatic unsaturation. Most preferable, Y is an alkenyl group or an organic group of the following formula:

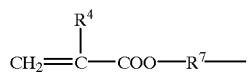

wherein $R^4$ is a hydrogen atom or a monovalent hydrocarbon group free of aliphatic unsaturation. $R^7$ is a divalent hydrocarbon group or an alkyleneoxyalkylene group. The alkenyl group can be represented by a vinyl group, a butenyl group, and a hexenyl group. The group represented by the above formula can be represented by a methacryloxyethyloxypropyl group.

In the formulae (A) and (B), a is 0 or 1, and m is an integer between 0 and 20, preferably between 0 and 10; n is an integer having a value of at least 1, preferably an integer between 10 and 200, and still more preferably, between 20 and 150. The difference between m and n should exceed 10, and still more preferably, should exceed 30; p is an integer of 1, 2, or 3. If p is equal to 3, an increased number of unsaturated aliphatic bonds will be introduced into the vinyl polymer of the present component. However, from the viewpoint of the availability of the raw material and for simplicity of synthesis p=1 is preferable.

The siloxane grafted vinyl polymer, which constitutes component (a) can be represented by a polymer of the general formula given below:

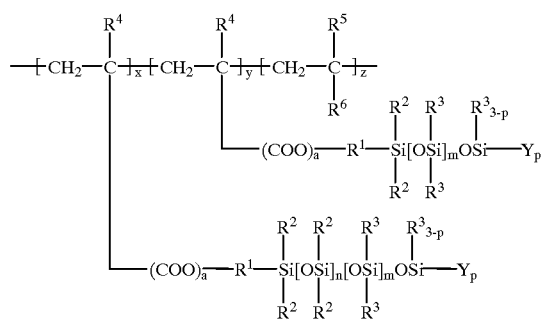

In this formula, $R^1$, $R^2$, $R^3$, Y, a, m, n and p are the same as defined above. $R^4$ is a hydrogen atom or a monovalent hydrocarbon group free of aliphatic unsaturation. The monovalent hydrocarbon group can be represented by the following groups: a methyl group, an ethyl group, a propyl group, a butyl group, a hexyl group or a similar alkyl group; a phenyl group, a tolyl group, a xylyl group or a similar aryl group; a benzyl group, a phenylethyl group or a similar arylalkyl group. $R^5$ is a hydrogen atom, a chlorine atom, or a monovalent hydrocarbon group free of aliphatic unsaturation. The monovalent hydrocarbon group may be the same as defined above for $R^4$. $R^6$ is a hydrogen atom, a chlorine atom, an alkenyl group, or a monovalent organic group which is free of acryloxy groups and methacryloxy groups. The monovalent group can be the same as defined for $R^4$ and can be represented by, e.g., an aryl group, a cycloalkyl group or a similar monovalent hydrocarbon group, as well as by a cyano group and by groups represented by the following formulae:

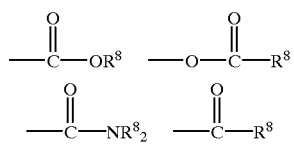

In the above formula $R^8$ is a hydrogen atom, a monovalent hydrocarbon group, an aminoalkyl group, or a carbinol group. More specifically, $R^8$ can be exemplified by the groups shown in the formulae given below:

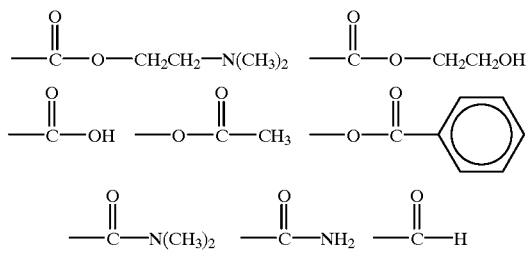

In addition, $R^6$ can also be exemplified by the following formulae:

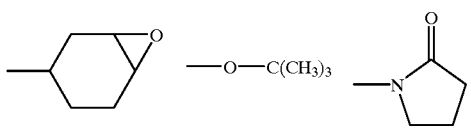

In the siloxane grafted vinyl polymer, x, y and z are integers which satisfy the following conditions: x>0, y>0, z≧0. It is recommended that the ratio between x, y and z, i.e., x : y : z, be equal to (0.02 to 5.00): (0.3 to 95.0): (0 to 99.67) mole %. More preferable is a ratio of (0.1 to 3.0): (1 to 90): (0 to 95), and still more preferable is a ratio of (0.5 to 2.0): (3 to 80): (0 to 96.5). It is recommended that the number-average molecular weight ($M_n$) of the siloxane grafted vinyl polymer not exceed 500,000, and preferably be between 1,000 and 300,000, and still more preferably between 10,000 and 200,000.

The siloxane grafted vinyl polymer, which constitutes component (a), can be prepared by copolymerizing the following components:

a silicone macromonomer represented, for example, by the following general formula (p):

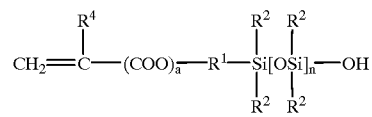

and a polymerizable monomer represented by the following general formula (q):

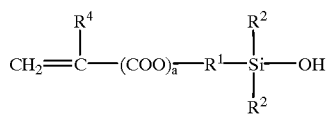

and, if necessary, a polymerizable vinyl polymer designated as component (r) is used in addition to components (p) and (q) mentioned above. The copolymerization results in the synthesis of a siloxane grafted vinyl polymer having silanol groups on silicone-chain terminals.

The silicone macromonomer, which constitutes component (p), comprises a polysiloxane which has a group suitable for vinyl polymerization on one terminal, and a silanol group on the other terminal. Component (p) imparts mold-release properties, peelability and low-friction properties, which are characteristics inherent in the original siloxane, to the product cured from the composition of the present invention. In the above formula, $R^1$, $R^2$, $R^4$ and a and n are the same as have been previously defined. It is recommended that the average molecular weight ($M_n$) of component (p) be within a range of 500 to 50,000, and preferably be between 1,000 and 20,000. This insures both improved peelability of cured coating films and copolymerability with other components. The silicone macromonomer can be produced by, e.g., causing living-anion polymerization of a cyclic trisiloxane using lithium methacryloxypropyl dimethyl silanol as a polymerization initiator, and then stopping the polymerization with an acid, such as an acetic acid, etc.

The component (p) can be exemplified by siloxanes of the following formulae:

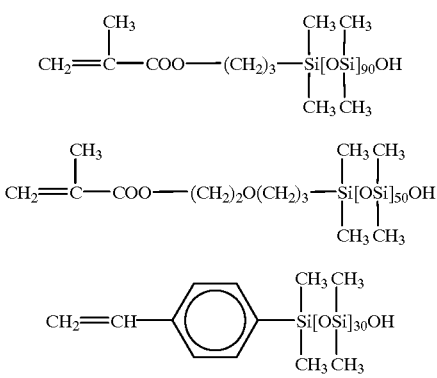

The polymerizable monomer, which constitutes component (q), is a silanol-containing compound which contains a group suitable for vinyl polymerization. In this formula $R^1$, $R^2$, $R^4$ and a are the same as defined above. This silanol containing compound can be obtained, e.g., by hydrolysis of a chlorosilane represented by the following formulae and contains a (meta) acrylate group (for reference see Japanese Laid-Open Patent Application [Kokai] Hei 6-256355).

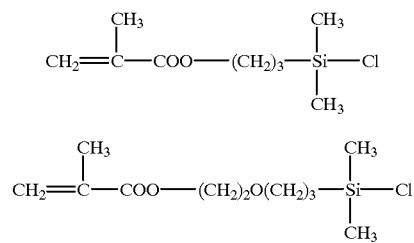

Component (q) is the main component for the introduction of unsaturated aliphatic bonds to the siloxane grafted vinyl polymer, which is component (a), through a reaction with component (s) described later. Component (q) increases the affinity of siloxane components (p) and (q) for the polymerizable vinyl monomer, such as component (r), and as a result, increases the content of unsaturated aliphatic bonds in component (a).

The component (q) can be exemplified by a silanol-containing compound of the following formulae:

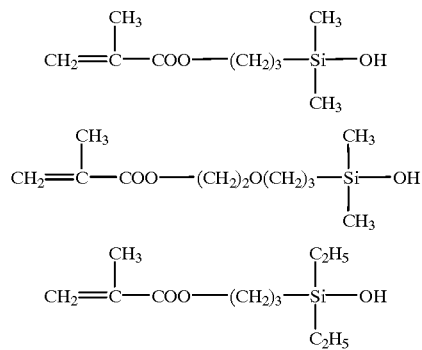

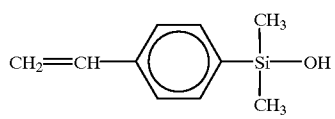

Component (r) may comprise radical-polymerizable vinyl monomers other than components (p) and (q) and may be a component obtained by copolymerizing components (p) and (q). It is preferable that component (r) be suitable for vinyl polymerization. For example, component (r) can be represented by various esters of an acrylic or methacrylic acid, an ethylene or its derivatives, an acrylic acid, a methacrylic acid, a vinyl acetate, a vinylidene chloride, vinyl chloride, polyalkyleneglycol monomethacrylate, or other compounds represented by the formulae given below:

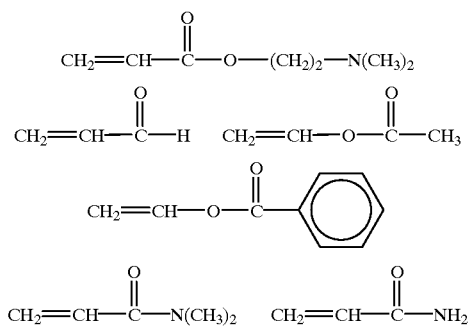

Two or more of the above component (r)'s may be combined.

Component (s) is used for introducing aliphatic unsaturation into the siloxane grafted vinyl polymer which constitutes component (a). Component (s) is an organic silicon compound represented by the formula: $R^3_{3-p}Y_p Si(OSiR^3_2)_m X$ (for reference see Japanese Patent Application Hei 9-342038). In this formulae $R^3$, Y, m and p are the same as defined above. X is a hydrolyzable group, such as a halogen atom, an alkoxy group, an acryloxy group, an amido group, an amino group, an aminoxy group and a ketoxymate group, halogen atoms being the most preferable from the viewpoint of availability of the raw material and simplicity of synthesis.

The component (s) can be exemplified by the compounds of the following formulae:

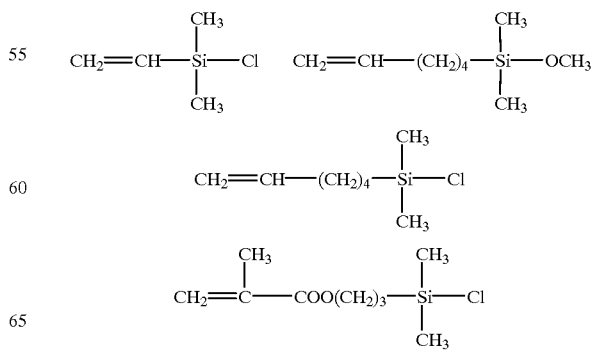

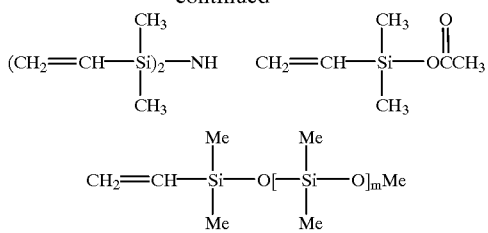

A silanol-functional silicone graft vinyl-type polymer, a precursor of vinyl-type polymer of component (a), can be synthesized by radical copolymerization of the components (p), (q), and if necessary, (r). In addition, other known polymerization methods can be used. The copolymerization proportions of components (p) to (r) will vary depending on the degree of polymerization of the silicone macromonomer and types of copolymerization monomer components. In general, however, the following proportions are recommended for component (p): component (q): component (r): (0.03 to 5.00): (0.3 to 95.0): (0 to 99.67) mole %, but preferably in a ratio of (0.1 to 3.0): (1 to 80): (0 to 95) mole %.

A radical polymerization initiator suitable for the invention may be an azo-bis isobutylonitrile or a similar azo-type compound, benzoyl peroxide, dicumyl peroxide or a similar organic peroxide. Polymerization can be carried out by a solution polymerization process, an emulsification polymerization process, a suspension polymerization process, or a bulk polymerization process. However, the solution polymerization process is preferable because it allows uniform dissolving of the components (p), (q) and (r) and provides a more uniform system during polymerization.

Solvents suitable for the process may vary depending on the type and quantity of component (r), however, in general, the following solvents are suitable: benzene, toluene, xylene or a similar aromatic hydrocarbon; methylethylketone, methylisobutylketone or similar ketones; ethylacetate, butylacetate or similar esters; tetrahydrofuran, dioxane, diethyl ether or similar ethers. These solvents can be used in a combination of two or more.

Condensation of the obtained silanol-functional siloxane grafted vinyl polymer and component (s) can be performed by dripping component (s) while stirring the mixture of the vinyl polymer with a basic substance. In order to insure that the reaction proceeds moderately, an organic solvent can be used. Such organic solvents may be represented by the following: pentane, heptane, hexane or similar aliphatic hydrocarbons; toluene, benzene, xylene or similar aromatic hydrocarbons; tetrahydrofuran, diethylether or similar ethers; carbon tetrachloride, trichloroethylene, chloroform or similar halogenated hydrocarbons; acetone, methylethylketone or similar ketones. A reaction temperature of below 100° C. is recommended.

If X in component (s) is a halogen atom then trapping agents for halogen halides, formed as by-products of condensation, can be used. Such trapping agents may be represented by basic compounds such as $NaHCO_3$, $Na_2CO_3$, NaOH, KOH, Mg $(OH)_2$, $Cu(OH)_2$, $MgCO_3$, $CaCO_3$ similar inorganic bases, or by triethylamine, diethylamine, pyridine, N,N dimethylaniline, piperidine or similar organic amines. Among these, it is common to use organic amines. Furthermore, basic compounds can be used individually or in a combination of two or more. It is recommended that the added amount be greater than the mole quantity of component (s). By preventing the reaction system from becoming acidic, the mutual condensation of silanol groups is limited. It is preferable that the basic compounds be dried before use in the reaction by means of molecular sieves.

Upon completion of the condensation reaction, the excess amines or similar basic compounds can be removed by washing after removal of salts from the obtained organic layer. Following this, azeotropic dehydration is carried out using an appropriate solvent and then substances with low boiling points, such as solvents, are removed by distillation with heating in a vacuum.

As a result, the siloxane grafted vinyl polymer, having unsaturated aliphatic bonds on the siloxane terminals are obtained. It is recommended that hexane or toluene, which have low reflux temperature and are resistant to gelation, be used as solvents for the azeotropic dehydration. It should be noted that prior art processes with esteracrylates readily result in gels. By contrast, our invention is able to use esteracrylates as a polymerizable vinyl monomer of component (r) without gelling.

Component (b) suitable for the composition of the present invention is an organic silicon compound having in one molecule at least two silicon-bonded hydrogen atoms. Component (b) is used as a cross-linking agent which causes curing of the composition of the invention. Organic silicon compounds having SiH bonds, useful in the hydrosilylation reaction, are know in the art and can include compounds or polymers represented by the following general formulae: $R^{10}_r HSiO_{3-r/2}$, where $R^{10}$ is a monovalent hydrocarbon, a hydroxide group or a hydrogen atom, and r is a number from 0 to up to about 3; or $H_q SiR_{4-q}$, where q is an integer from 2 to 4, R is a hydrogen atom or optionally substituted group.

Component (b) can also be represented by a hydrido siloxane macromonomer having, in one molecule, a silicon-bonded hydrogen atom and a 3-methacryloyl-oxypropyl group or a 3-acryloyl-oxypropyl group (for reference see Japanese Laid-Open Patent Application [Kokai] Hei 7-157522). Component (b) may have a linear, branched or a cyclic molecular structure and should have a viscosity from between several centistokes to several tens of thousands of centistokes at 25° C. Various types of the known organic silicon compounds can be used for the above purposes. Specific examples of siloxane compounds suitable for the invention are represented by the formulae given below:

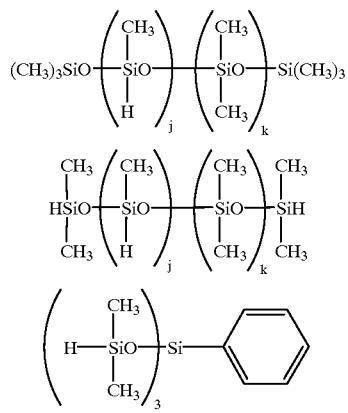

-continued

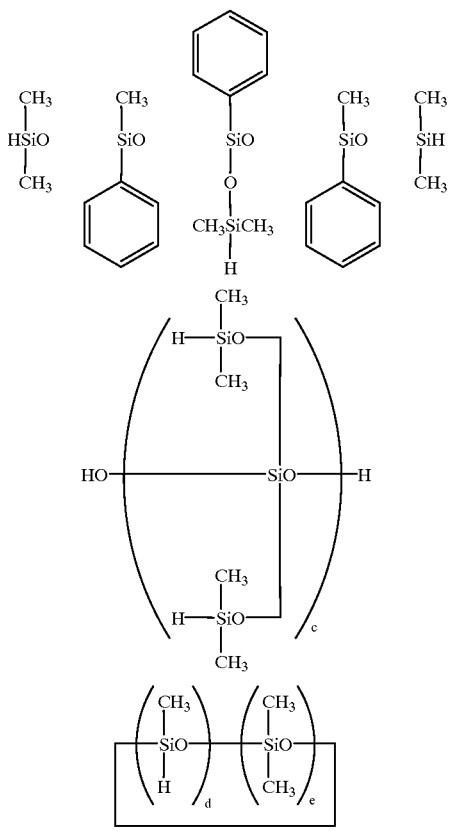

In this formulae, j and d are integers equal to or greater than 2, k and e are 0 or a positive integer, c is a positive integer, and (d+e) are equal to or greater than 3.

Component (b) can also be represented by a product of co-hydrolysis-condensation of the following formula: $(CH_3SiO_{3/2})_f(H(CH_3)SiO_{2/2})_g((CH_3)_3SiO_{1/2})_h$ (where f and h are 0 or a positive number, and g is a positive number), or a silicone resin which contains silicon-bonded hydrogen atom and has units represented by the following formula: $SiO_{4/2}$ (for reference see Japanese Laid-Open Patent Application [Kokai] Sho 61-195129).

It is recommended that component (b) be used in an amount so that the molar ratio of silicon-bonded hydrogen atoms in component (b) to unsaturated aliphatic bonds in component (a) is within a range of 0.4 to 10, preferably within a range of 0.6 to 5. When a mole ratio of silicon-bonded hydrogen atoms in component (b) to the unsaturated aliphatic bonds in component (a) is less than 0.4, it is difficult to ensure sufficient curing of the compound of the invention. If, on the other hand, the ratio exceeds 10, the cured body will have either air bubbles or a large amount of residual silicon-bonded hydrogen atoms, which with the lapse of time will cause an essential variation in the physical properties.

The hydrosilylation catalyst, which is component (c) of the composition of the invention, is a catalyst that promotes a reaction of addition of silicon-bonded hydrogen atoms in (b) to unsaturated aliphatic bonds in (a). These materials are know in the art and are commercially available. A conventional platinum-type catalyst, such as an alcoholic solution of a chloroplatinic acid or a complex of platinum with an alkenyl compound or with a phosphorous compound can be used for this purpose. In addition to platinum, a rhodium-type catalyst or a palladium-type catalyst also can be used. For example, the following compounds can represent component (c): platinum black, chloroplatinic acid, a complex of a chlroplatinic acid with an olefin, a complex of a chloroplatinic acid with an alcohol coordination compound, rhodium, a complex of rhodium with an olefin.

The amount of component (c) used in the present invention can determine reactivity of components (a) and (b), and can appropriately increase or decrease the rate of curing. However, in the case of the platinum or a rhodium catalyst, it is recommended that the catalyst be used in an amount of 0.1 to 500 parts by weight, preferably 1 to 300 parts by weight, against 1,000,000 parts of combined weight of both components (a) and (b).

The composition of the present invention is obtained by uniformly mixing components (a) through (c) in appropriate proportions. If necessary, however, components (a) through (c) can be combined with other conventional components in curable compositions such as; curing control agents, inorganic fillers such as silica, dyes, etc.

The curable composition of the invention can be used to form a peelable coating film. To form these films, the composition can be used as it is, or it can be dissolved in an appropriate solvent. The composition is spread over the surface of a substrate by a means such as a Mayer bar coating rod. The composition is then cured by heating the coating for 5 sec to 10 min or longer at a temperature of 100 to 180° C. It is recommended that, in terms of the amount of siloxane, the coating composition be used in an amount of 1 to 2.0 g/m².

The siloxane grafted vinyl polymer allows control of the content of the unsaturated aliphatic bonds in the composition of the invention within a wide range, and, as such, it possesses excellent curability. The cured film has good peelability, the resistance to peeling does not significantly change with the lapse of time, and peeling does not cause noticeable noise. Thus, the composition of the present invention is extremely suitable for the manufacture of peelable paper.

EXAMPLES

The invention will be further described in more detail with reference to practical examples. In these examples, the values of the viscosities were measured at 25° C., and Me designates methyl groups. The number-average molecular weights of the vinyl polymers are values referenced to polystyrene and were measured by means of gel permeation chromatography (hereinafter referred to as GPC). The content of vinyl groups in the obtained vinyl polymer were determined by means of iodometry. Curing properties of the composition, resistance of the obtained coating film to peeling, and noise produced by peeling were evaluated by the methods given below.

Curing properties

The curable composition of the present invention was applied onto the polyethylene surface of polyethylene-laminated paper, and subsequently cured. Curability was evaluated by strongly rubbing the obtained film with fingers. Experiments in which the cured film did not peel off were designated by a symbol ○; experiments in which the cured film peeled off were designated by a symbol Δ; and experiments where the coating film was not formed were designated by a symbol X.

Resistance to Peeling

A 38 mm-wide commercial adhesive tape (product of Nitto Denko Corp., Ltd., trademark 31B) was adhered to the surface of the cured coating film obtained by applying the composition of the invention onto the surface of polyethylene laminated sheet, adhering being carried out by moving a tape roller back and forth over the surface of the tape with a force of 2 kg. The unit was then maintained for 20 hours at 70° C. with an application of pressure to the adhesive tape of 20 g/cm². The load was then released, the unit was cooled for 2 hr at room temperature, and the force (g/38 mm) required for peeling off the adhesive tape was measured by pulling the adhesive tape up at an angle of 180° at a rate of 300 mm/min.

Noise

A 38 mm-wide commercial adhesive tape (product of Nitto Denko Corp., Ltd., trademark 31B) was adhered to the surface of the cured coating film obtained by applying the composition of the invention onto the surface of polyethylene laminated sheet, adhering being carried out by moving a tape roller back and forth over the surface of the tape with a force of 2 kg. The unit was then maintained for 20 hours at 70° C. with an application of pressure to the adhesive tape of 20 g/cm². The load was then released, the unit was cooled for 2 hours at room temperature, and then, while measuring noise, the adhesive tape was pulled up manually, at an angle of 180° to the surface. The noise produced during this operation was compared with the noise produced under the same conditions by peeling off the adhesive tape from the polyethylene surface of polyethylene laminated paper produced without a silicone coating. Experiments resulting in low noise were designated by symbol ○, and experiments where the noise was high were designated by symbol X.

SYNTHESIS EXAMPLE 1

A 500 ml four-neck flask equipped with a stirrer, a thermometer, and a dripping funnel was loaded with 25 g of water, 41.4 g (408.7 mmol) of triethylamine, and 70 ml of hexane. A mixture of 30 g (136.2 mmol) of methacryloxypropyl dimethylchlorosilane and 30 ml of hexane was then added by dripping while cooling the contents of the flask in a water bath so that the reaction temperature would not exceed 30° C. Upon completion of the dripping, the mixture was stirred for 1 hr, and after checking that pH did not show acidity, the flask was left to stand, the water layer was separated, and the obtained organic layer was three times washed with water. Following this, 0.06 g of 2,6-di-ti-butyl-4-methylphenol were added to the organic layer, and azeotropic dehydration was conducted for 1 hr. Upon completion of the azeotropic dehydration, hexane was removed from the reaction mixture by heating in a vacuum, whereby 27 g of the reaction product were obtained. The obtained reaction product was analyzed by nuclear magnetic resonance (hereinafter referred to as NMR) which showed that the product was a silanol compound of the formula given below. Gas chromatography (hereinafter referred to as GLC) of this silanol compound showed that the product has a purity of 99%.

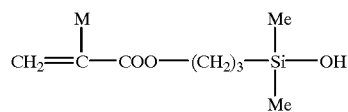

SYNTHESIS EXAMPLE 2

A 1-liter four-neck flask equipped with a stirrer, a thermometer, a cooling tube, and a nitrogen supply tube was loaded with 188g of toluene and 247 g (3.337 mole) of hexamethyl cyclotrisiloxane, and the components were mixed. Upon completion of the mixing, azeotropic dehydration was conducted for 1 hr. The product was cooled to room temperature, the reaction system was filled with nitrogen, loaded with 250.2 μl (0.4203337 mmol) of 1.68N hexane solution of n-butyl lithium, and the contents were stirred for 10 min. The product was then combined with a mixture of 10.72 g (52.98 mmol) of methacryloxypropyl dimethylsilanol synthesized in Synthesis Example 1, 19.8 g of dimethylformamide, and 61.8 g of acetonitrile, and then a polymerization reaction was initiated. Progress of the polymerization reaction was monitored by means of GLC, and when the degree of conversion of the hexamethyl cyclotrisiloxane reached 81.0%, acetic acid was added, and the reaction was stopped. The obtained toluene solution was combined with 12.9 mg of hydroxynone monomethyl ether, and the low-boiling-point substances were removed by heating in a vacuum. As a result, 217.3 g of a transparent colorless liquid were obtained. The NMR analysis and infrared light-absorption analysis showed that the product was a silicone macromonomer represented by the following average structural formula:

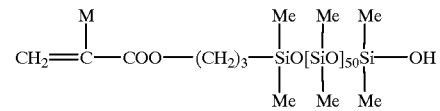

The GPC of the obtained silicone macromonomer showed that it had a number-average molecular weight of 5,290, and a polydispersity degree of 1.10.

SYNTHESIS EXAMPLE 3

A 100-ml three-neck flask equipped with a stirrer, a thermometer, a cooling tube, and a nitrogen supply tube was loaded with 30 g of toluene, and 30 min bubbling with gaseous nitrogen was conducted, whereby dissolved oxygen was removed, the contents of the flask were then combined with 13 g (101.43 mmole) of butyl acrylate, 1 g (4.942 mmole) of the methacryloxypropyl dimethylsilanol (obtained in Synthesis Example 1), 6 g (1.316 mmole) of silicone macromonomer (obtained in Synthesis Example 2), and 0.4 g of azo-bis-isobutylonitryl. Bubbling with a gaseous nitrogen was then conducted for an additional 30 min. The obtained reaction mixture was stirred for 24 hr in a nitrogenous atmosphere at 60° C. GPC confirmed the peaks attributable to butyl acrylate, methacryloxypropyl dimethylsilanol, and the silicone macromonomer of the starting raw material were almost completely lost. The toluene solution was then combined with 2.06 g (28.161 mmole) of a dried diethylamine added through molecular sieves 3A, and a mixture of 2.26 g (18.77 mmole) of dimethylvinyl chlorosilane and 20 g of toluene were added through a dripping funnel under a nitrogenous atmosphere. Upon completion of the dripping the mixture was stirred for 15 hr at room temperature, and a condensation reaction was carried out. The reaction solution was filtered, the obtained salt removed, and the product was washed three times with water. After adding 2 mg of 4-methoxyphenol to the obtained organic layer, the low-boiling-point substances were removed by heating in a vacuum. As a result, 16.2 g of a semisolid reaction product was obtained. NMR analysis of the obtained reaction product showed that the silanol group signals were extinguished and that the product was made up of a siloxane-based graft polyacrylate, having siloxane terminals represented by the average structural formula given below. The obtained silioxane-based graft polyacrylate has a number-average molecular weight of 49,673 and a vinyl group content of 0.947 wt. % (theoretical value: 0.824 wt. %).

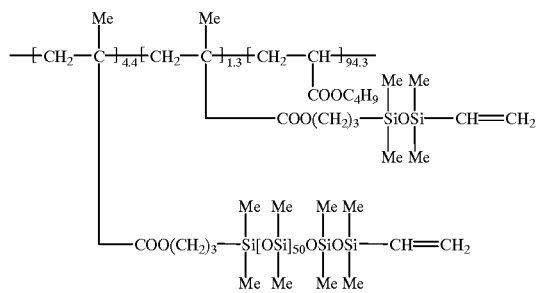

SYNTHESIS EXAMPLE 4

A mixture of 480 g (3.58 mole) of 1,1,3,3-tetramethyldisiloxane, 120 g of concentrated hydrochloric acid, and 200 g of cold water (5° C.). While the mixture was stirred, 600 g (3.95 mole) of tetramethoxysilane were added by dropwise for 1.5 hr. At this point, the maximum temperature of the liquid was 30° C. Upon complete addition of the tetramethoxysilane, the polymer layer (the lower layer) was separated, the product was washed with water. It was then subjected to a reduced pressure of 2 mm Hg, and heated at 130° C. for 2 hr, causing removal of the low-boiling-point substances. As a result, 6.77 g (yield 94%) of an organic silicon compound having a viscosity of 16.4 mPa s and represented by the following average structural formula, $(HMe_2SiO_{1/2})_{1.82}SiO_{4/2}$, were obtained. A ratio of a weight-average molecular weight (Mw) of the obtained organic silicon compound to its number-average molecular weight (Mn), i.e., Mw/Mn was equal to 1.06. A mole ratio of a residual MeOSi to $HMe_2SiO_{1/2}$ was equal to 0.06. Furthermore, the content of the silicon-bonded hydrogen atoms was 1.0 wt. % (measured value).

PRACTICAL EXAMPLE 1

A uniform mixture was prepared by adding 7.02 parts by weight of the organic silicon compound, $(HMe_2SiO_{1/2})_{1.82}SiO_{4/2}$ (obtained in Synthesis Example 4) and 0.516 parts by weight of a 2 wt. % isopropanol solution of a chloroplatinic acid to 100 parts by weight of the siloxane grafted polyacrylate synthesized in Synthesis Example 3. The mole quantity of the silicon-bonded hydrogen atoms was twice the mole quantity of the vinyl groups. The obtained curable composition was dissolved in n-hexane so that the concentration of solids was 8 wt. %. With the use of a bar coater, the obtained solution was spread over the polyethylene surface of polyethylene paper so that the amount of solids in the coating was 0.5 g/m². Upon completion of the coating, the coating layer was cured at 120° C. by placing it into an oven for 5 min. The curability, resistance of the cured coating film to peeling, and peeling noise were measured. Resistance to peeling was measured by using the adhesive tape directly after curing (peeling resistance value A) and maintaining the cured product 24 hr at room temperature after curing was complete (peeling resistance value B). Results of the measurements are shown in Table 1.

PRACTICAL EXAMPLE 2

A uniform mixture was prepared by adding 9.00 parts by weight of organohydridopolysiloxane, having a viscosity of 20 mPa s and represented by the following average structural formula: $Me_3SiO(MeHSiO)_nSiMe_3$, and 0.55 parts by weight of 2 wt. % isopropanol solution of a chloroplatinic acid to 100 parts by weight of the siloxane grafted polyacrylate synthesized in Synthesis Example 3. The mole quantity of silicon-bonded hydrogen atoms was four times the mole quantity of the vinyl groups. A cured coating film was produced by the same method as Practical Example 1. The curability, resistance to peeling, and peeling noise were measured in the same manner as in Practical Example 1. The results of the measurements are shown in Table 1.

PRACTICAL EXAMPLE 3

A uniform mixture was prepared by adding 4.53 parts by weight of organohydridopolysiloxane, having a viscosity of 20 mPa s and represented by the following average structural formula: $Me_3SiO(MeHSiO)_nSiMe_3$, and 0.27 parts by weight of 2 wt. % isopropanol solution of a chloroplatinic acid to 100 parts by weight of the siloxane grafted polyacrylate synthesized in Synthesis Example 3. The mole quantity of silicon-bonded hydrogen atoms was two times the mole quantity of the vinyl groups. A cured coating film was produced by the same method as Practical Example 1. The curability, resistance to peeling, and peeling noise were measured in the same manner as in Practical Example 1. The results of the measurements are shown in Table 1.

COMPARATIVE EXAMPLE 1

A 200-ml four-neck flask equipped with a stirrer, a thermometer, a cooling tube, and a nitrogen supply tube was loaded with 60 ml of tetrahydrofuran, the mixture was bubbled with nitrogen gas for 30 min, whereby dissolved oxygen was removed. The contents of the flask were then combined with 7.9 g (61.7 mmole) of butyl acrylate, 14.4 g (146 mmole) of the ethylacrylate, 10 g (4.6 mmole) of silicone macromonomer represented by the following average structural formula:

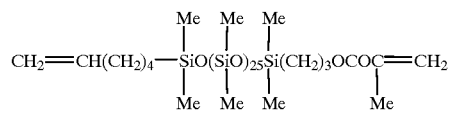

and 0.5 g of azo-bis-isobutylonitryl. Bubbling with gaseous nitrogen was then conducted for an additional 30 min. The obtained reaction mixture was stirred for 24 hr in a nitrogenous atmosphere at 60° C. The solvent and unreacted monomer were then removed by vacuum distillation. GPC and NMR analyses confirmed that the butyl acrylate, ethylacrylate and the silicone macromonomer of the starting raw material underwent a copolymerization reaction. Also, analyses confirmed the hexenyl groups on the terminals of the silicone macromonomer did not undergo change. Thus, it could be concluded that the obtained reaction product comprised a siloxane grafted vinyl polymer containing hexenyl groups on siloxane terminals.

One hundred parts by weight of the siloxane grafted vinyl polymer were uniformly mixed with 2.4 parts by weight of a copolymer of a methylhydrido siloxane and a dimethyl siloxane having trimethylsiloxy groups on both molecular terminals (a copolymerization ratio of 1:1 and an average degree of polymerization equal to 10) and 0.1 parts by weight of a 2 wt. % isopropanol solution of chloroplatinic acid. The mole quantity of silicon-bonded hydrogen atoms became 1.2 times the mole quantity of hexenyl groups. The obtained curable composition was dissolved in n-hexane so that the concentration of solids became equal to 8 wt. %.

With the use of a bar coater, the solution was spread over the polyethylene surface of polyethylene laminated paper so that the amount of solids in the coating equaled 0.5 g/m². Upon completion of the coating, curability of the cured coating film was measured. However, the film was not peelable, and thus was impossible to measure resistance to peeling and peeling noise.

COMPARATIVE EXAMPLE 2

A 50-ml three-neck flask equipped with a stirrer, a thermometer, a cooling tube, and a nitrogen supply tube was loaded with 7.8 g of toluene, and the mixture was bubbled with nitrogen gas for 30 min, whereby dissolved oxygen was removed. The contents of the flask were then combined with 4 g (31.21 mmole) of butyl acrylate, 1.2 g (0.2715 mmole) of the silicone macromonomer represented by the following average structural formula:

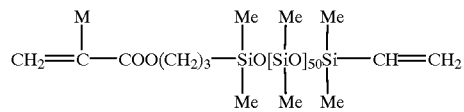

and 0.1 g of azo-bis-isobutylonitryl. Bubbling with a gaseous nitrogen was then conducted for an additional 30 min. The obtained reaction mixture was stirred in a nitrogenous atmosphere at 60° C. Gelation began to appear within a few hours, and further progress of the reaction became impossible.

TABLE 1

| | Curability | Resistance to Peeling A (g/ 38 mm) | Resistance to Peeling B (g/ 38 mm) | Noise |
|---|---|---|---|---|
| Practical Ex. 1 | ○ | 20 | 25 | ○ |
| Practical Ex. 2 | ○ | 38 | 30 | ○ |
| Practical Ex. 3 | ○ | 100 | 420 | ○ |
| Comparative Ex. 1 | Δ | — | — | — |

What is claimed is:

1. A curable composition, comprising:
   (a) a siloxane grafted vinyl polymer having grafted siloxane chains of the formulae (A) and (B):

Formula (A):
   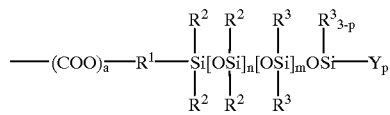

Formula (B):
   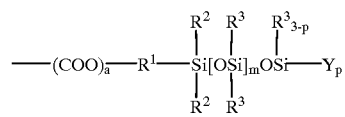

where $R^1$ is a divalent hydrocarbon group, $R^2$ is a monovalent hydrocarbon group which is free of aliphatic unsaturation, $R^3$ is a monovalent hydrocarbon group, Y is a monovalent hydrocarbon group having aliphatic unsaturation, a is 0 or 1, m is an integer between 0 and 20, n is an integer having a value of at least 1, and p is an integer of 1,2,or3;

(b) an organic silicon compound having at least two silicon-bonded hydrogen atoms; and
   (c) a hydrosilylation catalyst.

2. The curable composition of claim 1, wherein component (a) is a siloxane grafted vinyl polymer represented by the following formula:

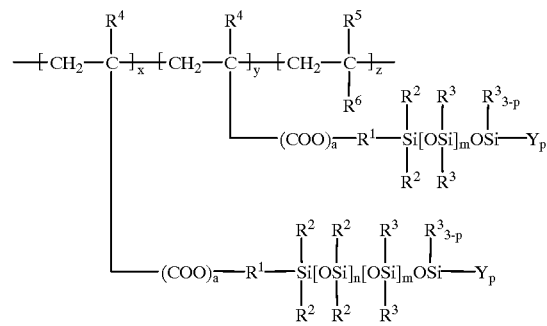

where $R^1$ is a divalent hydrocarbon group, $R^2$ is a monovalent hydrocarbon group which is free of aliphatic unsaturation, $R^3$ is a monovalent hydrocarbon group, $R^4$ is selected from hydrogen or a monovalent hydrocarbon group which is free of aliphatic unsaturation, $R^5$ is selected from hydrogen, chlorine, or a monovalent hydrocarbon group which is free of aliphatic unsaturation, $R^6$ is selected from hydrogen, chlorine, an alkenyl group, an acryloxy group, or a monovalent hydrocarbon group which is free of aliphatic unsaturation, Y is a monovalent hydrocarbon group having unsaturated aliphatic bonds, a is 0 or 1, m is an integer between 0 and 20, n is an integer having a value of at least 1, p is an integer of 1, 2, or 3, and wherein x, y, and z are integers such x>0, y>0, z>0.

3. The curable composition of claim 2 wherein $R^2$ and $R^3$ are methyl.

4. The curable composition of claim 3 wherein $R^1$ is selected from ethylene, propylene, butylene, hexylene, phenylene, or ethyleneoxypropylene.

5. The curable composition of claim 1 wherein the organo silicon compound is selected from;

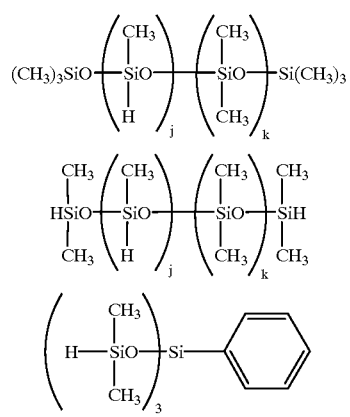

-continued

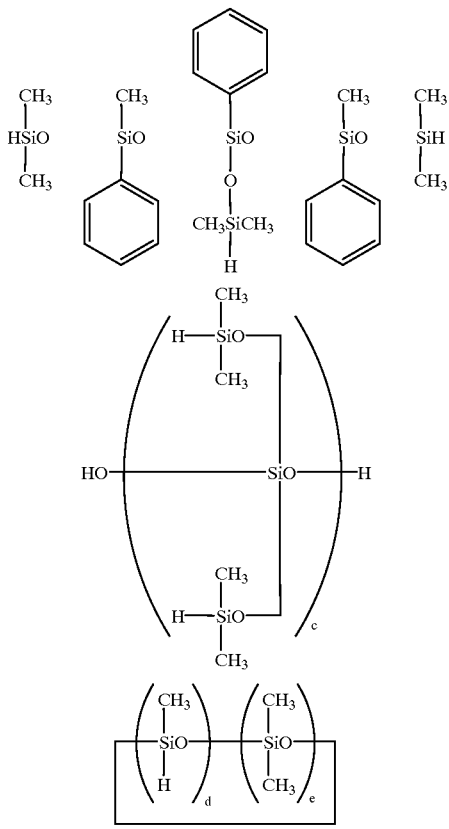

wherein j and d are integers equal to or greater that 2, and k and e are 0 or a positive integer, c is a positive integer, and (d+e) are equal to or greater than 3.

6. The curable composition of claim 5 wherein the organic silicon compound is a trimethylsiloxy end-capped organohydridopolysiloxane.

7. The curable composition of claim 5 wherein the organic silicon compound has the average structural formula $(HMe_2SiO_{1/2})_{1.82}SiO_{4/2}$.

8. The curable composition of claim 1 wherein the molar ratio silicon-bonded hydrogen atoms of component (b) to the unsaturated aliphatic bonds in component (a) is within a range of 0.4 to 10.

9. The curable composition of claim 8 wherein the molar ratio of silicon-bonded hydrogen atoms of component (b) to the unsaturated aliphatic bonds in component (a) is within a range of 0.6 to 5.

10. A curable composition for the formation of a peelable curable coating film comprising the curable composition of claim 1.

11. A method for the formation of a peelable curable coating comprising;

a) spreading a composition comprising the curable composition of claim 1 over the surface of a substrate to form a coated substrate, b) curing said composition at a temperature in the range of 100 to 180° C.

12. A substrate coated with the curable composition of claim 1.

13. The substrate of claim 12 wherein said curable composition is present in a quantity of 1 to 2.0 g/m².

* * * * *